(12) United States Patent
Flaim

(10) Patent No.: US 11,182,027 B2
(45) Date of Patent: Nov. 23, 2021

(54) CONVERTIBLE FABRIC COVERING DEVICE

(71) Applicant: Ryan E. Flaim, Duxbury, MA (US)

(72) Inventor: Ryan E. Flaim, Duxbury, MA (US)

( * ) Notice: Subject to any disclaimer, the term of this patent is extended or adjusted under 35 U.S.C. 154(b) by 189 days.

(21) Appl. No.: 16/054,658

(22) Filed: Aug. 3, 2018

(65) Prior Publication Data

US 2019/0037941 A1    Feb. 7, 2019

Related U.S. Application Data

(60) Provisional application No. 62/541,483, filed on Aug. 4, 2017.

(51) Int. Cl.
*A41D 11/00*    (2006.01)
*A41D 3/08*    (2006.01)
*G06F 3/044*    (2006.01)

(52) U.S. Cl.
CPC ............ *G06F 3/044* (2013.01); *A41D 3/08* (2013.01); *A41D 11/00* (2013.01)

(58) Field of Classification Search
CPC ..................................................... A41B 13/10
USPC .... 2/69, 69.5, 88, 207, 209.11, 46, 48, 49.1; 5/494
See application file for complete search history.

(56) References Cited

U.S. PATENT DOCUMENTS

| | | | | |
|---|---|---|---|---|
| 2,677,834 | A * | 5/1954 | Moynihan | A47G 9/0207 128/872 |
| 3,160,892 | A * | 12/1964 | Semons | A41D 7/008 2/88 |
| 5,652,960 | A * | 8/1997 | Kaknevicius | A41D 1/215 2/104 |
| 5,722,094 | A * | 3/1998 | Ruefer | A41B 13/06 2/69 |
| 5,735,004 | A * | 4/1998 | Wooten | A41B 13/06 5/502 |
| 6,012,756 | A * | 1/2000 | Clark-Dickson | B62B 9/142 296/107.02 |
| 2008/0235870 | A1* | 10/2008 | Heide | A47G 9/068 5/484 |
| 2009/0193561 | A1* | 8/2009 | Masukawa | A47D 15/00 2/104 |
| 2009/0199337 | A1* | 8/2009 | Long | A47G 9/068 5/494 |
| 2014/0013509 | A1* | 1/2014 | Gravett | A47G 9/068 5/494 |
| 2015/0196126 | A1* | 7/2015 | Bowe | A47C 7/66 2/104 |
| 2020/0121007 | A1* | 4/2020 | Gibbons | B62B 9/142 |

* cited by examiner

*Primary Examiner* — Katherine M Moran
(74) *Attorney, Agent, or Firm* — Mintz Levin Cohn Ferris Glovsky and Popeo, P.C.; Peter F. Corless; Carolina E. Säve

(57) ABSTRACT

A convertible fabric covering device adapted to transform from a blanket into a wearable device is provided. The device includes a first fabric covering layer with a first fabric tab coupled thereon and a second fabric covering layer with a second fabric tab coupled thereon, and coupled to the first fabric covering layer. The first fabric tab and the second fabric tab include a coupling mechanism disposed at a distal end of each of the first fabric tab and the second fabric tab.

17 Claims, 20 Drawing Sheets

FIG. 17
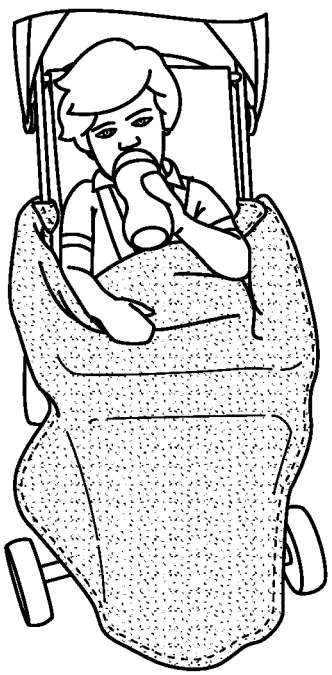

CONVERTIBLE FABRIC COVERING DEVICE

CROSS-REFERENCE TO RELATED APPLICATION

This Application claims the benefit of U.S. Provisional Application 62/541,483 filed on Aug. 4, 2017. The entire contents of these applications are incorporated herein by reference in their entirety.

BACKGROUND

1. Technical Field

The present disclosure relates generally to a convertible fabric covering device, and more particularly, to a convertible fabric covering device which uses an interlocking coupling mechanism.

2. Description of the Related Art

Recently, consumer demand for baby and child products have evolved to require multi-use items. For example, consumer preferences tend toward products that grow with the child and are used through different phases of development. However, many items are single use and are used for a short duration of time. For example, infant blanket, stroller blankets play-mats and nursing covers are used while the child is immobile or in very early phases of development and are cast aside when the child enters the next developmental phase. Accordingly, various products and devices for overcoming the above-described obstacles in childhood products have been developed. Some examples include convertible blankets and nursing covers, and the like.

However, a number of these devices merely transition from an infant blanket to nursing covers and do not provide improvements for use following the initial stages of child development. The devices are also not capable of being worn by a child to assist or promote imaginative play which has been shown to improve the cognitive and motor abilities of a child. Accordingly, the object of this disclosure is to provide a convertible fabric covering device that will more effectively provide multi-use applications by conversion from an infant blanket, to a play-mat, to nursery décor, to a nursing cover to a stroller blanket to a wearable accessory.

The above information disclosed in this section is merely for enhancement of understanding of the background of the disclosure and therefore it may contain information that does not form the prior art that is already known in this country to a person of ordinary skill in the art.

SUMMARY

The present disclosure provides a convertible fabric covering device which uses an interlocking coupling mechanism and transforms from a blanket (e.g., or the like) to wearable accessory. In particular, the device may be used as a blanket, a play-mat, a wall hanging or nursery décor item, an infant seat blanket, a stroller blanket, a children's wearable accessory (e.g., fantasy play item such as a cape or other costume) or a nursing cover.

According to one aspect, convertible fabric covering device adapted to transform from a blanket into a wearable device may include a first fabric covering layer with a first fabric tab coupled thereon and a second fabric covering layer with a second fabric tab coupled thereon, and coupled to the first fabric covering layer. The first fabric tab and the second fabric tab may include a coupling mechanism disposed at a distal end of each of the first fabric tab and the second fabric tab.

In some exemplary embodiments, the convertible fabric covering having the first fabric tab may include a first coupling surface attached to the distal end of the tab and a second coupling surface attached to the second fabric covering layer opposite to a proximal end of the first fabric tab attachment point on the first fabric layer. The convertible fabric covering device having the second fabric tab may include a first coupling surface attached to the distal end of the tab and a second coupling surface attached to the first fabric covering layer opposite to a proximal end of the second fabric tab attachment point on the second fabric layer.

In other exemplary embodiments, the convertible fabric covering device may include the first fabric tab in a closed position with the first coupling surface attached to the distal end of the tab coupled to the second coupling surface attached to the first fabric covering layer. In addition, the convertible fabric covering device may include the second fabric tab in a closed position having the first coupling surface attached to the distal end of the tab coupled to the second coupling surface attached to the second fabric covering layer.

In some exemplary embodiments, the convertible fabric covering device may include the first fabric tab having the first coupling surface attached to a second coupling surface attached to the second fabric covering layer. The second fabric tab having the first coupling surface may be attached to the second coupling surface of the first fabric covering layer. The convertible fabric covering device may include the first fabric tab in a closed position having the first coupling surface attached to the distal end of the tab coupled to the second coupling surface attached to the second fabric covering layer. The distal end of the second fabric tab may be inserted through a loop formed by the first fabric tab in the closed position and may have the second fabric tab disposed in a closed position with the first coupling surface attached to the distal end of the tab coupled to the second coupling surface attached to the first fabric covering layer. Additionally, the second fabric tab may be looped around a ring and then fastened to the second coupling surface. The ring may disposed between the first and second fabric tabs when the tabs are in a closed position.

In some exemplary embodiments, the convertible fabric covering device may include wearable device used as a nursing cover. The convertible fabric covering device may include the wearable device coupled to a frame of a stroller using the first and second fabric tabs. Additionally, the wearable device may be coupled to a frame of an infant restraint seat using the first and second fabric tabs. The wearable device may be coupled to a toy using the first and second fabric tabs to form a lovie. The convertible fabric covering device may be coupled to a hanging device to form a decorative item. The convertible fabric covering device may be extended on a surface with the first and the second fabric tabs in a closed position to form a play-mat.

In some exemplary embodiments, the convertible fabric covering device may include the first fabric covering layer formed from a three panel assembly. Additionally, the second fabric covering layer may be formed from a three panel assembly. Each panel of the three panel assembly may be coupled together to form the first or the second fabric layer. The convertible fabric device may include the first and second fabric layers with a top portion of the shape formed by the layers that form a straight line, a first and a second side that gradually increase the width between the first and second side from the top to a bottom portion of the shape and a u-shaped bottom portion. The convertible fabric device may include fabric from any one from the group consisting of: a cotton fabric, a synthetic material, a double gauze material, a textured material, or an organic fabric or the like.

Notably, the present disclosure is not limited to the combination of the device elements as listed above and may be assembled in any combination of the elements as described herein.

Other aspects of the disclosure are disclosed infra.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 17 illustrates the attachment of the convertible fabric covering device coupled to a stroller frame according to an exemplary embodiment of the present disclosure;

FIG. 18 illustrates the attachment of the convertible fabric covering device coupled to a stroller frame according to an exemplary embodiment of the present disclosure;

DETAILED DESCRIPTION

The presently disclosed subject matter will be described more fully hereinafter with reference to the accompanying drawings, in which some, but not all embodiments of the disclosure are shown. The presently disclosed subject matter may be embodied in many different forms and should not be construed as limited to the embodiments set forth herein; rather these exemplary embodiments are provided so that this disclosure will satisfy applicable legal requirements. Indeed, many modifications and other exemplary embodiments of the presently disclosed subject matter set forth herein will come to mind to one skilled in the art to which the presently disclosed subject matter pertains, having the benefit of the teachings presented in the foregoing descriptions and the associated drawings. Therefore, it is to be understood that the presently disclosed subject matter is not limited to the specific embodiments disclosed and that modifications and other exemplary embodiments are intended to be included within the scope of the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In one aspect, the present disclosure provides a convertible fabric covering device which uses an interlocking coupling mechanism and transforms from a blanket to wearable accessory. In particular, the device may have multiple uses including an infant blanket, an infant play-mat, a wall hanging or nursery décor item, an infant safety seat blanket, a stroller blanket, a children's wearable accessory (e.g., fantasy play item such as a cape or other costume) or a nursing cover. FIGS. 1-4 illustrate the convertible fabric covering device according to an exemplary embodiment of the present disclosure.

Figure 1:
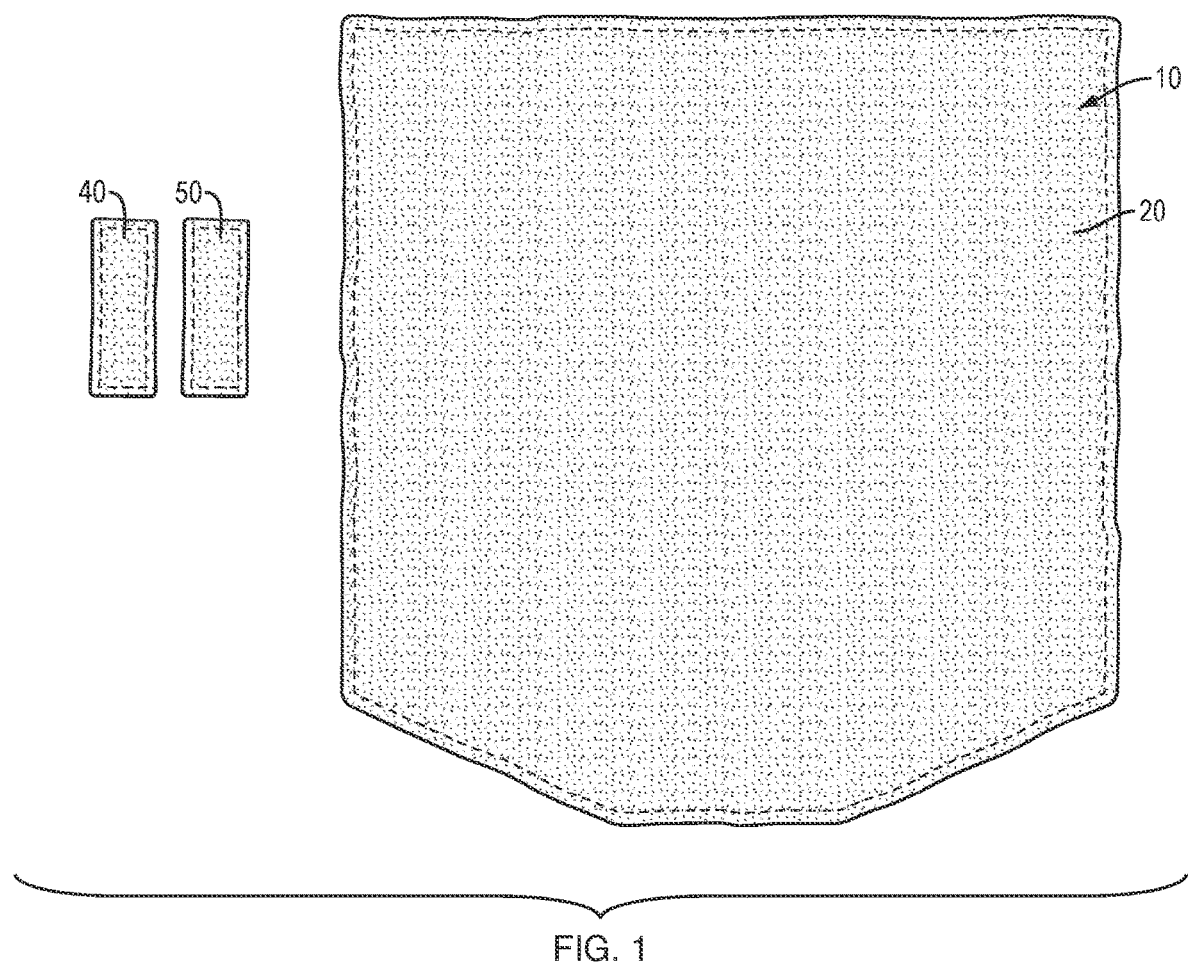
FIG. 1 illustrates an exemplary front exploded view of the convertible fabric covering device according to an exemplary embodiment of the present disclosure.
Figure 2:
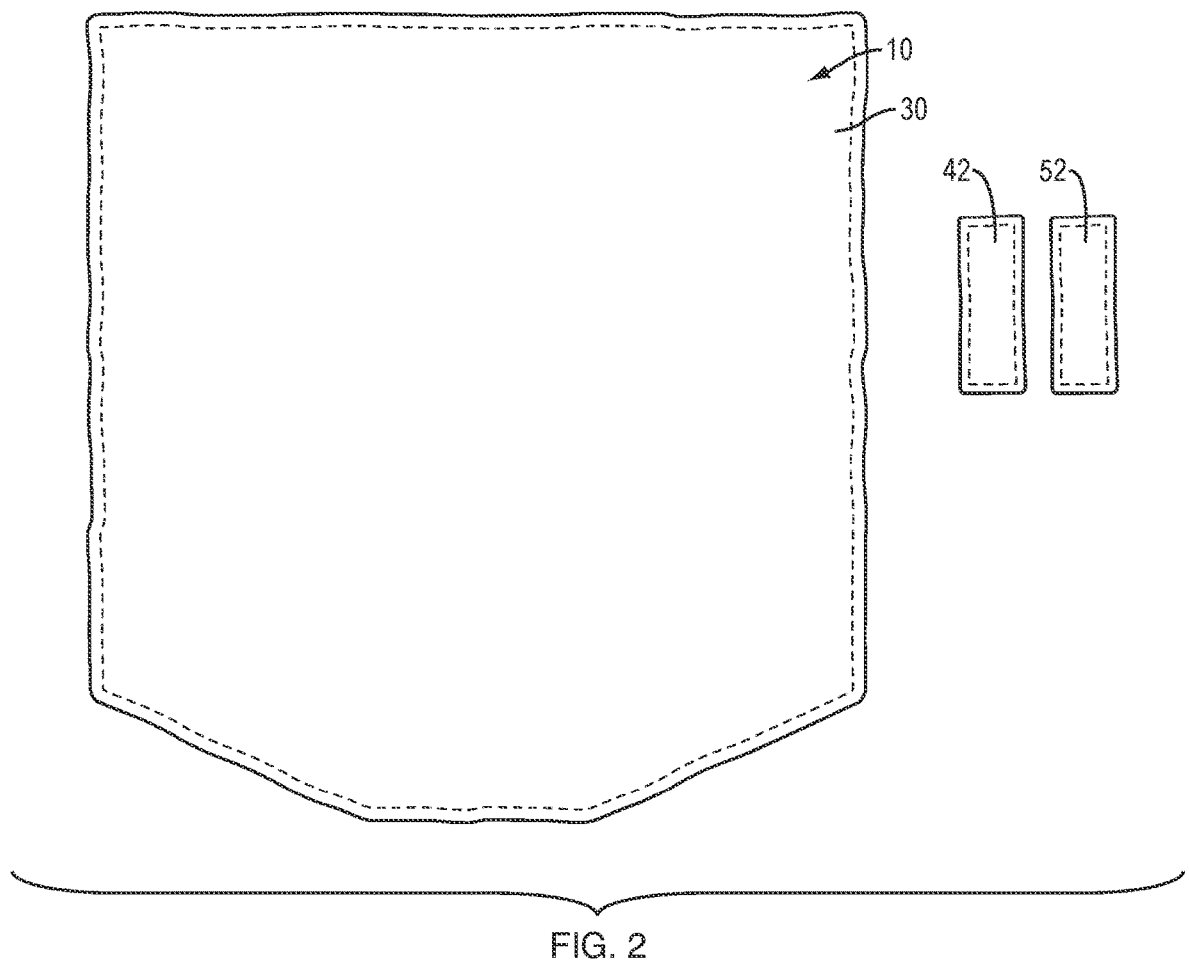
FIG. 2 illustrates an exemplary rear exploded view of the convertible fabric covering device according to an exemplary embodiment of the present disclosure.
Figure 3:
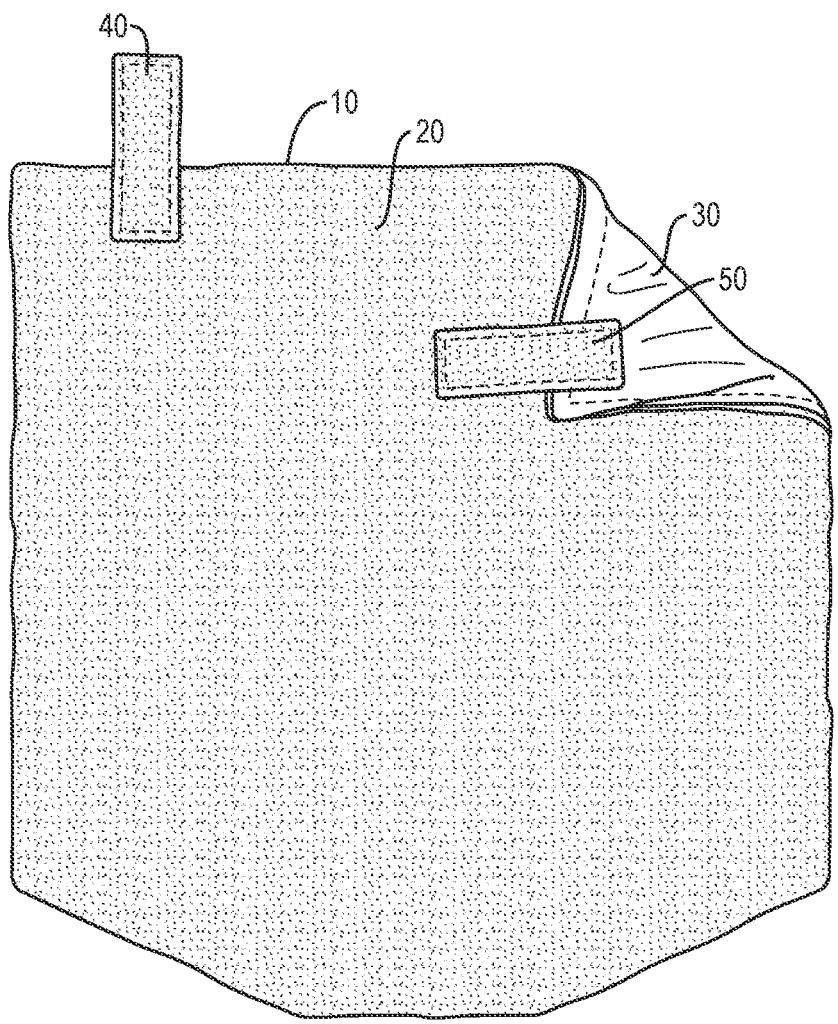
FIG. 3 illustrates an exemplary front view of the convertible fabric covering device according to an exemplary embodiment of the present disclosure.
Figure 4:
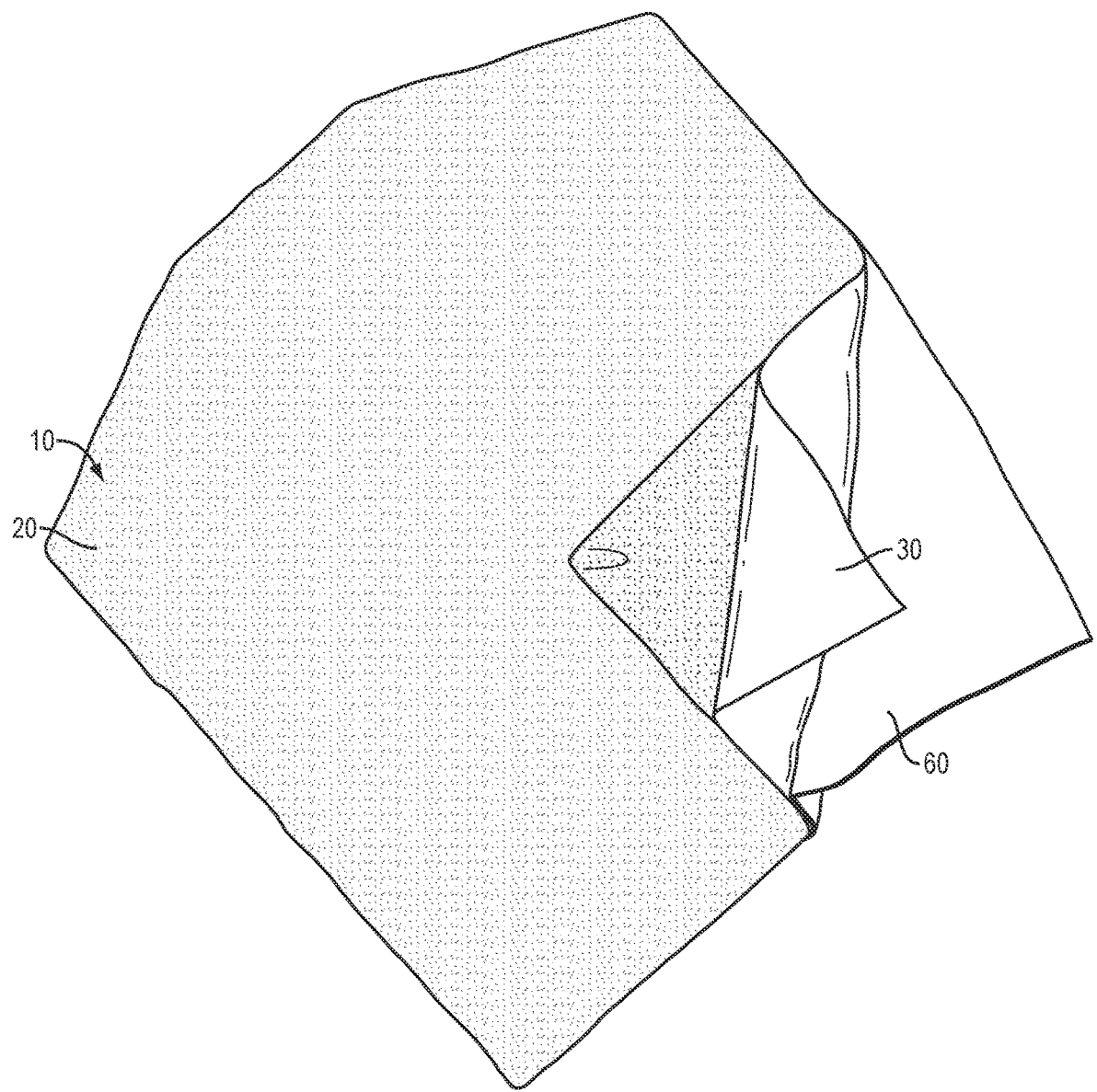
FIG. 4 illustrates an exemplary exploded view of the convertible fabric covering device according to an exemplary embodiment of the present disclosure.

Referring to FIGS. 1-3, the a convertible fabric covering device 10 according to an exemplary embodiment of the present disclosure may include a first fabric covering layer 20 with a first fabric tab 40 coupled thereon and a second fabric covering layer 30 with a second fabric tab 50 coupled thereon. The first fabric covering layer 20 and the second fabric covering layer 30 may be coupled together. The first fabric tab 40 and the second fabric tab 50 may include a coupling mechanism 31, 32 disposed at a distal end of each of the first fabric tab 40 and the second fabric tab 50. The coupling mechanisms may be provided on coupling surfaces, to be described herein. That is, the coupling mechanism is not limited to a particular material as long as it provides sufficient strength to support a coupling mechanism in an attached position remaining a child safe material (e.g., safe to be used in children's products and meets government safety regulation). For example, the coupling mechanism may be a hook and loop fastener, magnetic, snaps or the like. The coupling mechanism may be formed of any shape such as circular, square, or the like. The first fabric tab and the second fabric tab may have the same or different dimensions. The first fabric tab and the second fabric tab may be about 2.5 inches to about 6 inches in length and may be produced using a single or double layer of material. For example, the tabs may be formed of about 2 inch wide grosgrain or Petersham ribbon, but the material and size are limited thereto. Additionally as shown in FIG. 4 a padding material 40 may be disposed between the first fabric layer 20 and the second fabric layer 30. Alternately, the convertible fabric covering device 10 may include a single layer of material.

Figure 5:
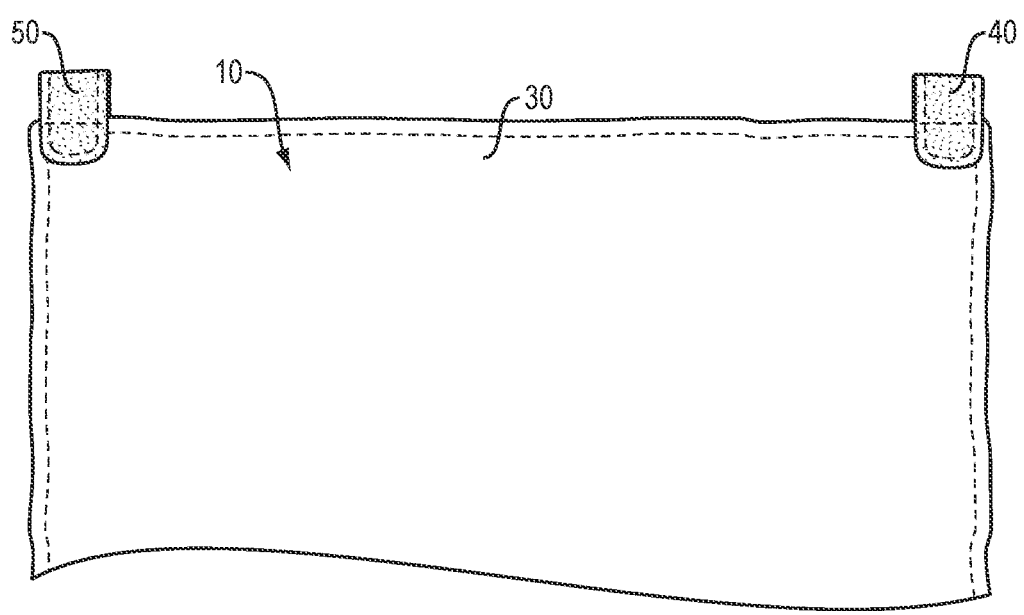
FIG. 5 illustrates an exemplary rear view of the convertible fabric covering device according to an exemplary embodiment of the present disclosure.
Figure 6:
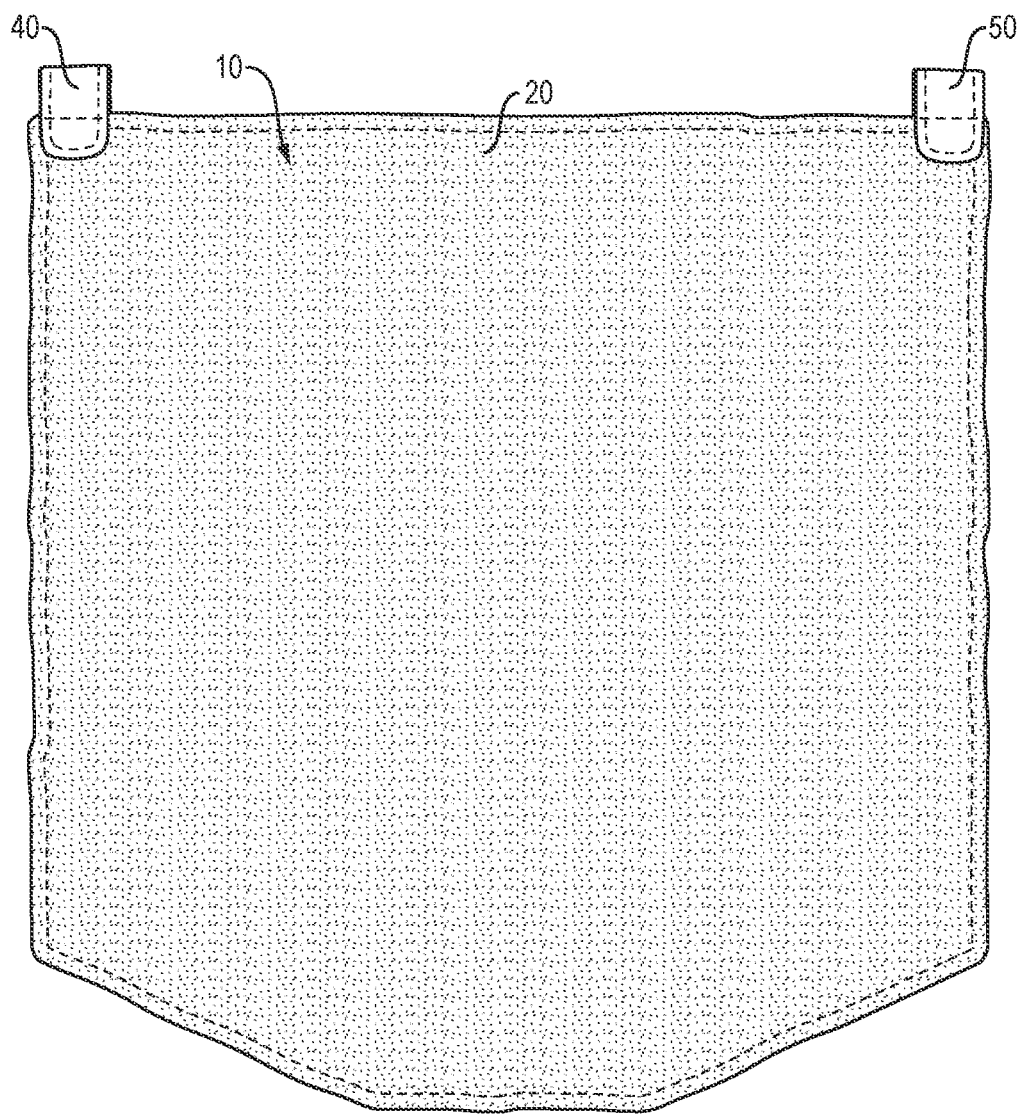
FIG. 6 illustrates an exemplary front view of the convertible fabric covering device according to an exemplary embodiment of the present disclosure.
Figure 7:
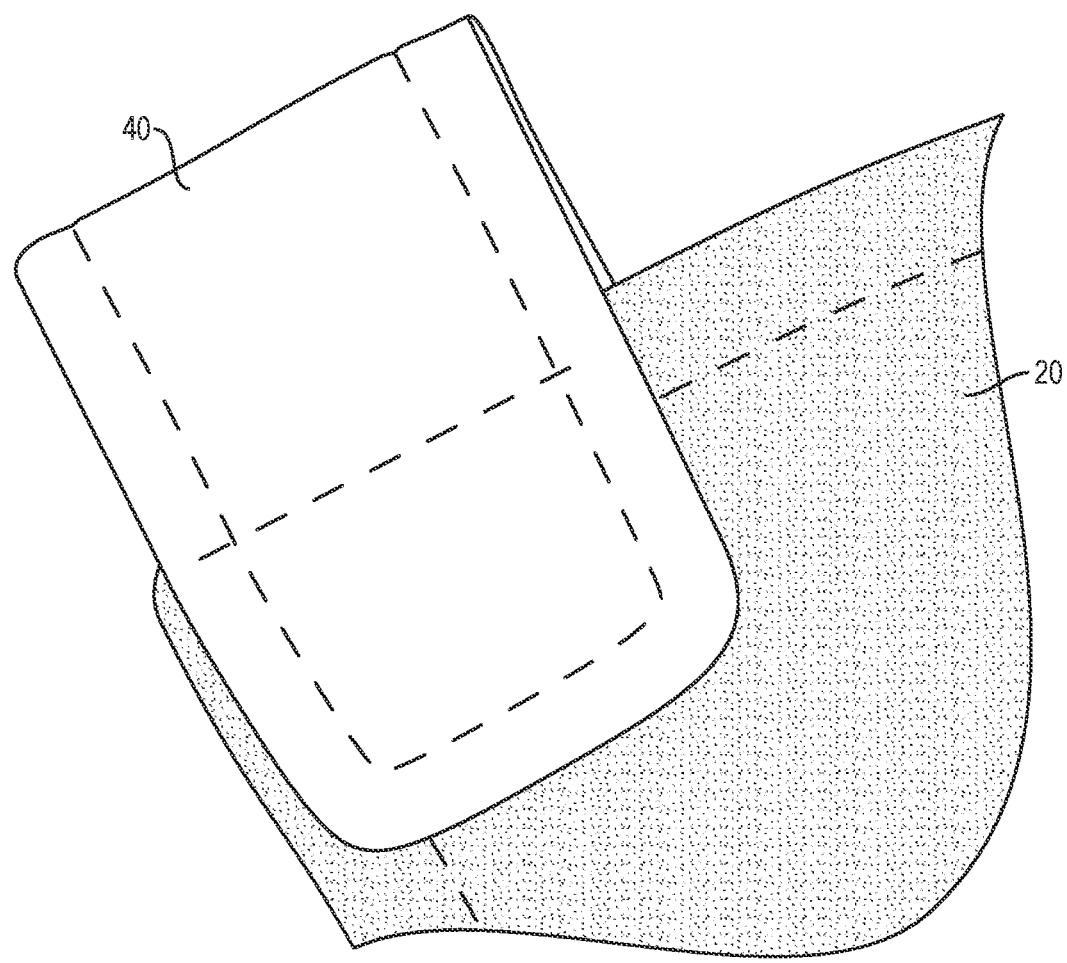
FIG. 7 illustrates an exemplary attachment tab of the convertible fabric covering device according to an exemplary embodiment of the present disclosure.
Figure 8:
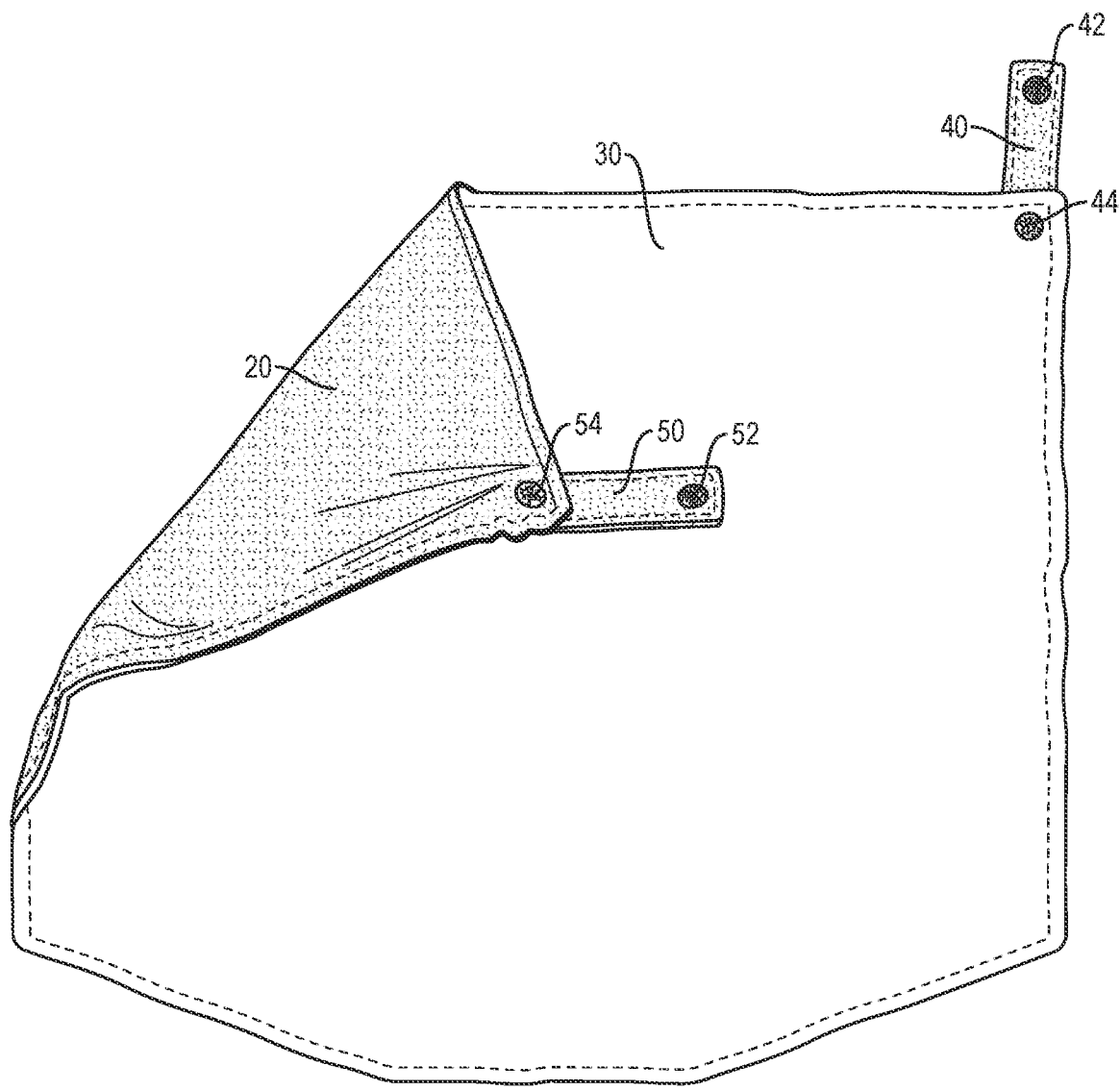
FIG. 8 illustrates an exemplary embodiment of the rear and front view of the convertible fabric covering device with the fabric tabs in an open position according to an exemplary embodiment of the present disclosure.

Further, as shown in FIGS. 5-9 the convertible fabric covering may have a plurality of coupling surfaces. For example, as shown in FIGS. 5 and 6 the first fabric tab 40 and the second fabric tab 50 are shown in a closed position. In particular, as shown in FIG. 8 the convertible fabric covering 10 having the first fabric tab 40 may include a first coupling surface 42 attached to the distal end of the first fabric tab and a second coupling surface 44 attached to the second fabric covering layer 30 opposite to a proximal end of the first fabric tab 40 attachment point on the first fabric layer 20. The convertible fabric covering device 10 may include the second fabric tab 50 with a first coupling surface 52 attached to the distal end of the second fabric tab 50 and a second coupling surface 54 attached to the first fabric covering layer 20 opposite to a proximal end of the second fabric tab 50 attachment point on the second fabric layer 30.

Figure 9:
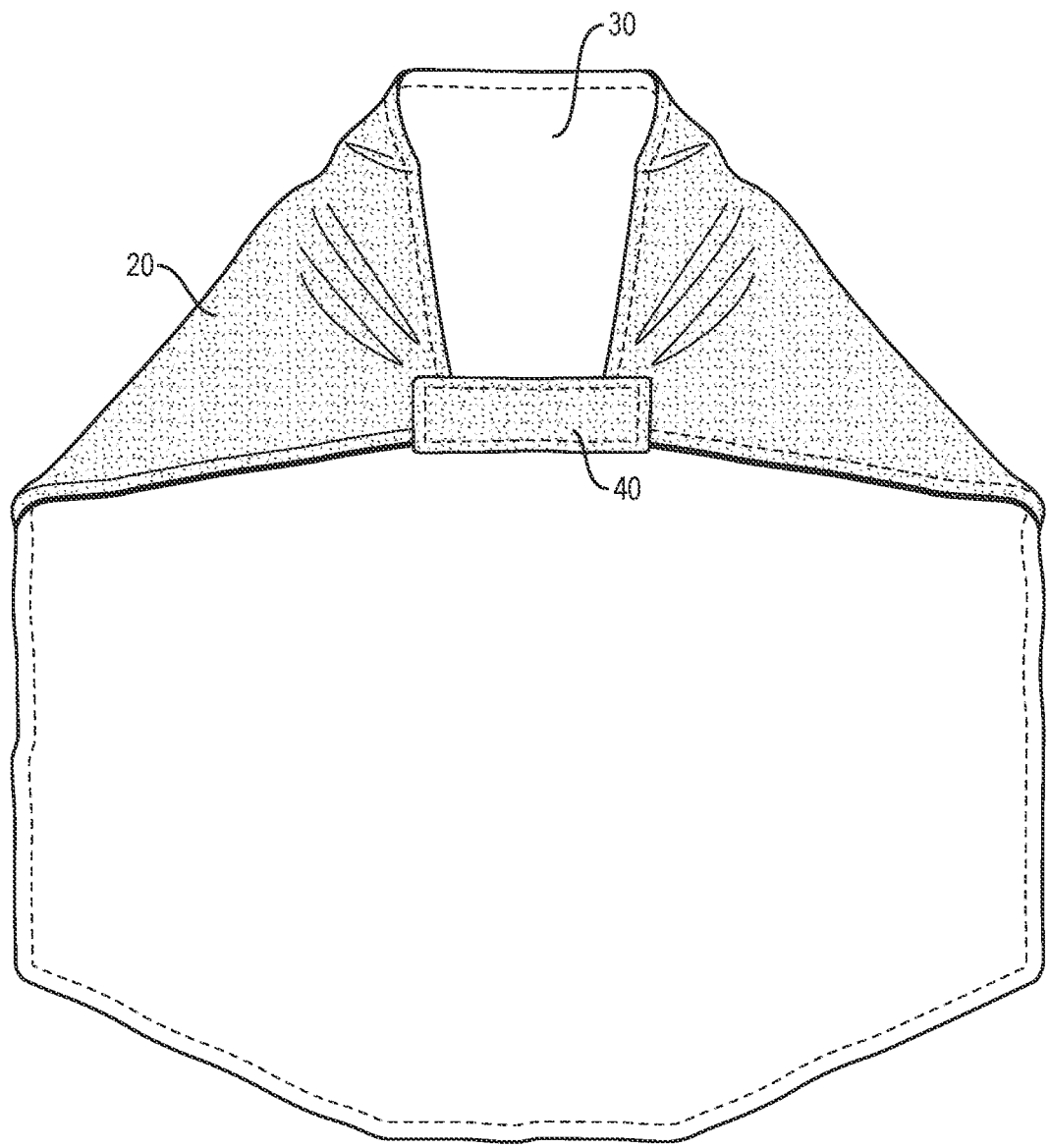
FIG. 9 illustrates an exemplary embodiment of the rear and front view of the convertible fabric covering device with the fabric tabs in an attached position according to an exemplary embodiment of the present disclosure.

Additionally, as shown in FIGS. 5-7, the convertible fabric covering device 10 may include the first fabric tab 40 having the first coupling surface attached to a second coupling surface attached to the second fabric covering layer 30. The second fabric tab 50 having the first coupling surface may be attached to the second coupling surface of the first fabric covering layer 20. As shown in FIG. 9, the convertible fabric covering device may include multiple closed position arrangements. In particular, the first fabric tab 40 may be place in a closed position with the first coupling surface 42 attached to the distal end of the tab coupled to the second coupling surface 54 attached to the first fabric covering layer 20. In addition, the convertible fabric covering device 10 may include the second fabric tab 50 in a closed position having the first coupling surface 52 attached to the distal end of the tab coupled to the second coupling surface 44 attached to the second fabric covering layer 30.

Figure 10:
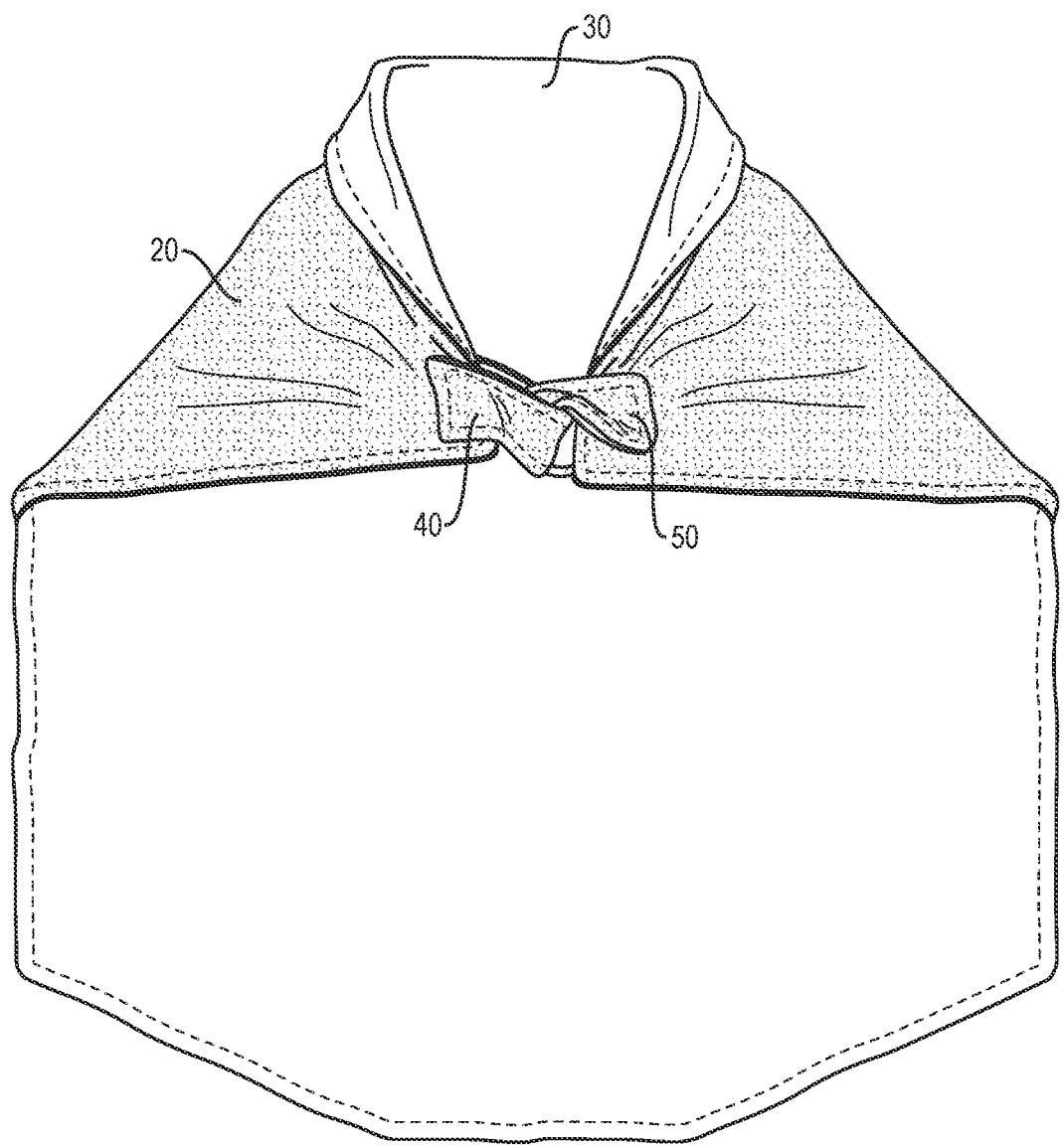
FIG. 10 illustrates an exemplary embodiment of the rear and front view of the convertible fabric covering device with the fabric tabs in a semi-attached position according to an exemplary embodiment of the present disclosure.
Figure 11:
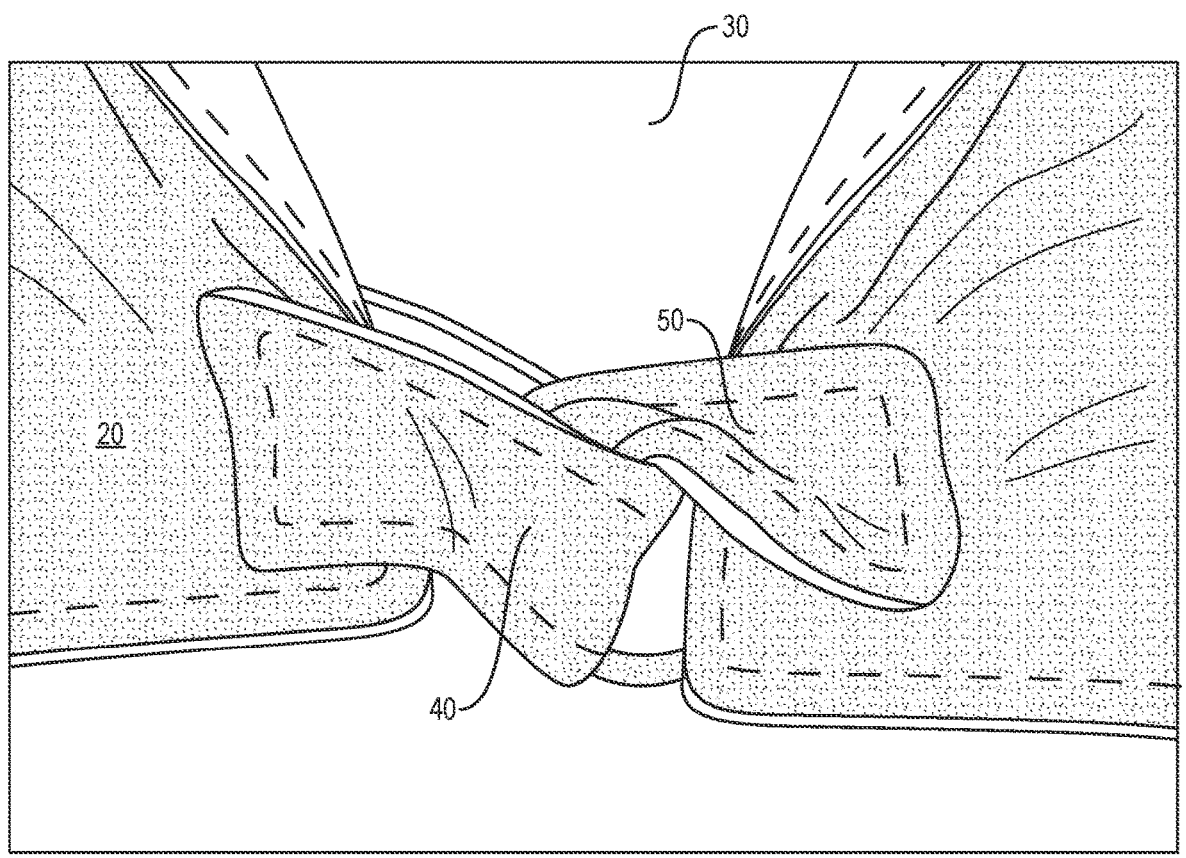
FIG. 11 illustrates an exemplary embodiment of the rear and front view of the convertible fabric covering device with the fabric tabs in an attached position according to an exemplary embodiment of the present disclosure.

As shown in FIGS. 10-11 another alternate embodiment that may include the convertible fabric covering device 10 having the first fabric tab 40 in a closed position. The first coupling surface may be attached to the distal end of the tab coupled to the second coupling surface attached to the second fabric covering layer 30. The distal end of the second fabric tab 50 may be inserted through a loop formed by the first fabric tab 40 in the closed position. The second fabric tab 50 may be disposed in a closed position with the first coupling surface attached to the distal end of the tab coupled to the second coupling surface attached to the first fabric covering layer 20.

Figure 12:
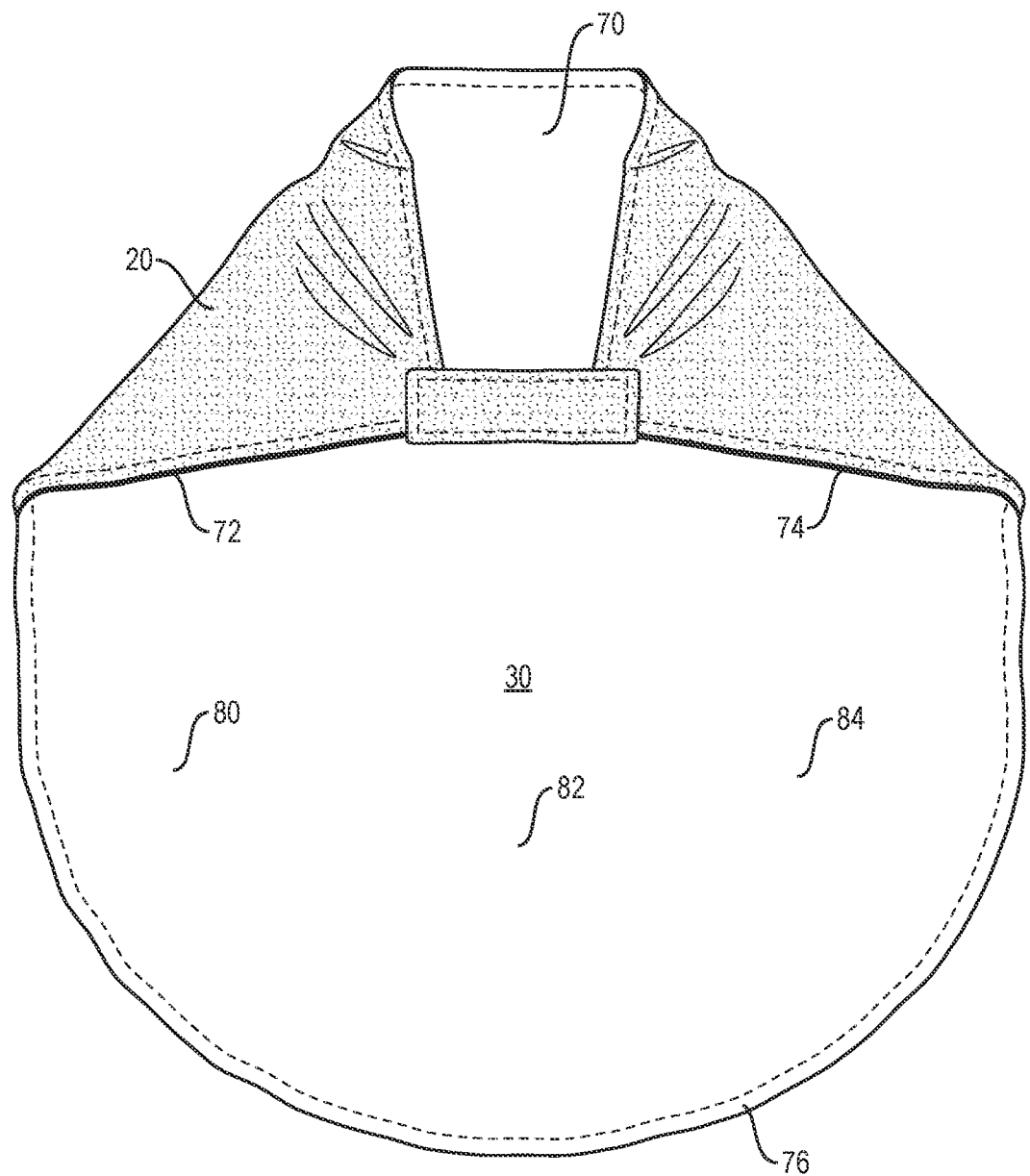
FIG. 12 illustrates an exemplary embodiment of the rear and front view of the convertible fabric covering device with the fabric tabs in an attached position according to an exemplary embodiment of the present disclosure.

Additionally as shown in FIG. 12, the convertible fabric covering device may include the first fabric covering layer 20 formed from a three panel assembly. Additionally, the second fabric covering layer 30 may be formed from a three panel assembly 80, 82, 84. The convertible fabric device 10 of may include the first and second fabric layers with a top side 70 that forms a straight line, a first and a second side 72, 74 that gradually increase the width between the first and second side from the top to a bottom side and a u-shaped bottom side 76. For example the convertible fabric device may be about 23 inches to 30 inches wide and 25 inches to about 30 inches in length for a child size product. The convertible fabric device may be formed of any material such as cotton, terry cloth, or the like. Furthermore, a miniaturized version may be used for a toy or a doll having a similar configuration to the child sized version.

Figure 13:
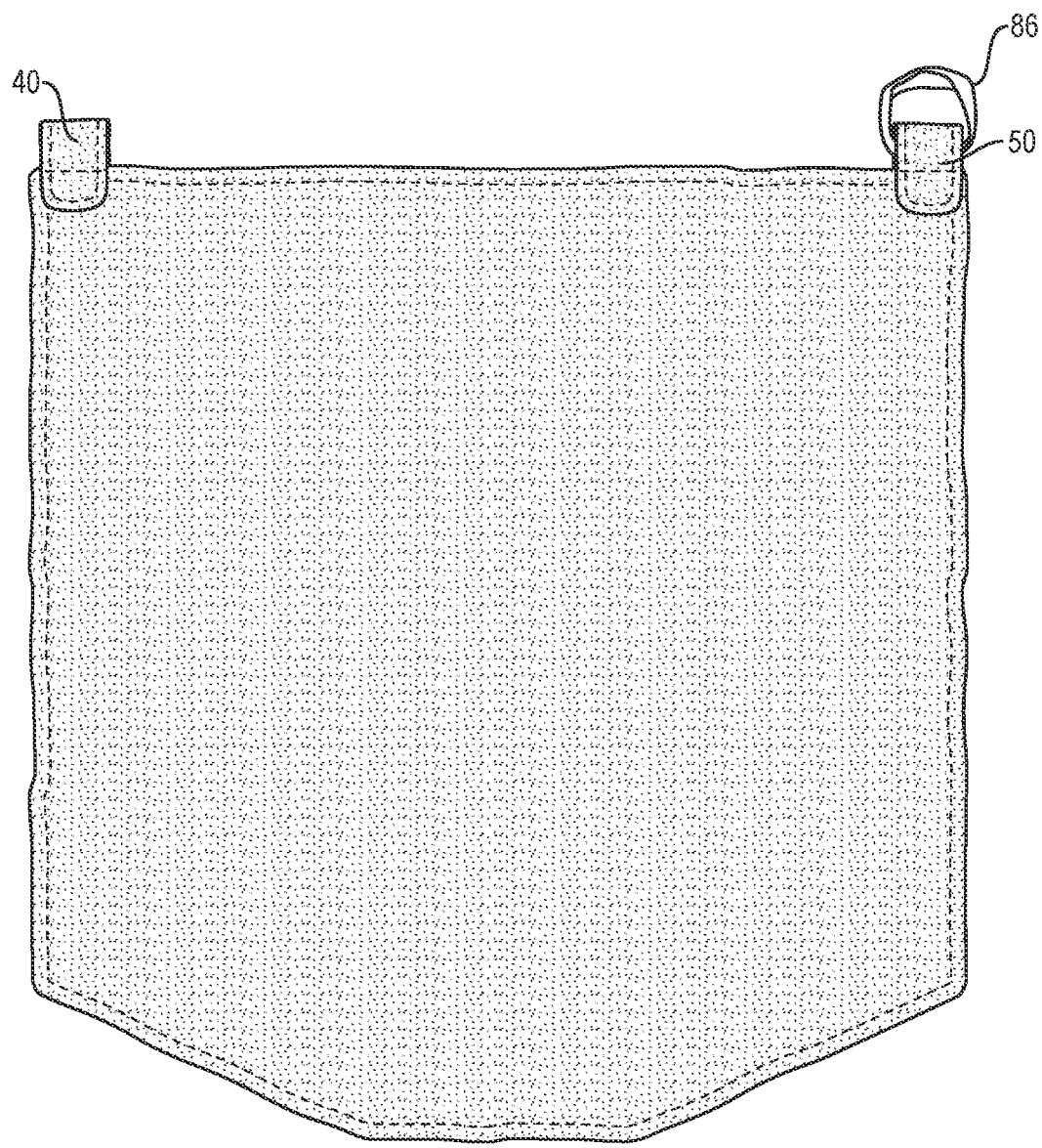
FIG. 13 illustrates an exemplary ring attached to one of the fabric tabs according to an exemplary embodiment of the present disclosure.
Figure 14:
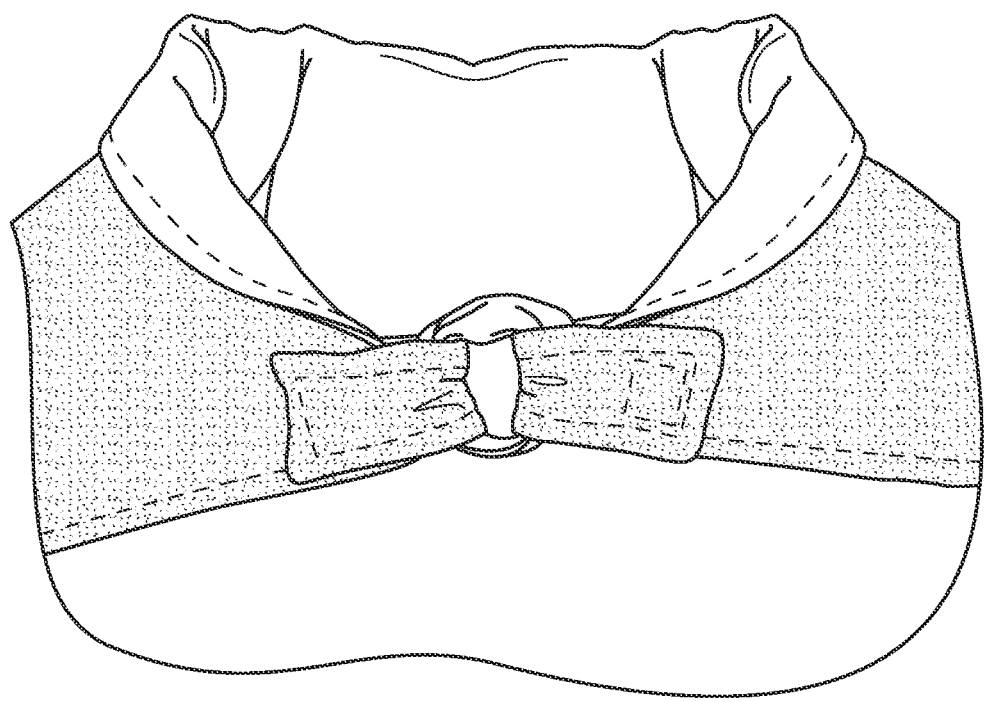
FIG. 14 illustrates an exemplary embodiment of the rear and front view of the convertible fabric covering device of FIG. 13 in an attached position according to an exemplary embodiment of the present disclosure.

According to another exemplary embodiment of the present disclosure and as shown in FIG. 13, a ring 86 may be attached to the second fabric tab 50. The ring may be a ribbon, a wooden ring, a rubber teething ring, or the like. The ring is also not limited to a circular shape and may be formed in any shape that is capable of being attached between the two fabric tabs. The first fabric tab 40 may then be fastened around the ring 86 to be in an attached position as shown in FIG. 14. For example, the second fabric tab 50 may be folded through or looped around the ring to be in a closed position around the ring 86, thereby holding the ring in place. Alternately, the ring 86 may be first attached to the first fabric tab 40 and then the second fabric tab 50 may be attached to the ring 86 for the convertible fabric covering to be in an attached position. In another exemplary embodiment, one of the fabric tabs may be sewn in a closed position with the ring disposed therein (e.g., the tab may be looped around the ring and then sewn in a closed position) to thus be in a fixed ring holding position. In this embodiment, the other of two fabric tabs may be capable of being opened and closed as described above.

Figure 15:
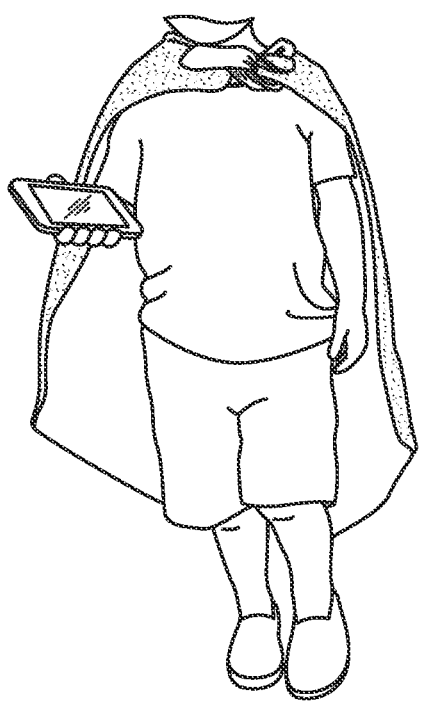
FIG. 15 illustrates the attachment of the convertible fabric covering device as a wearable accessory according to an exemplary embodiment of the present disclosure.
Figure 16:
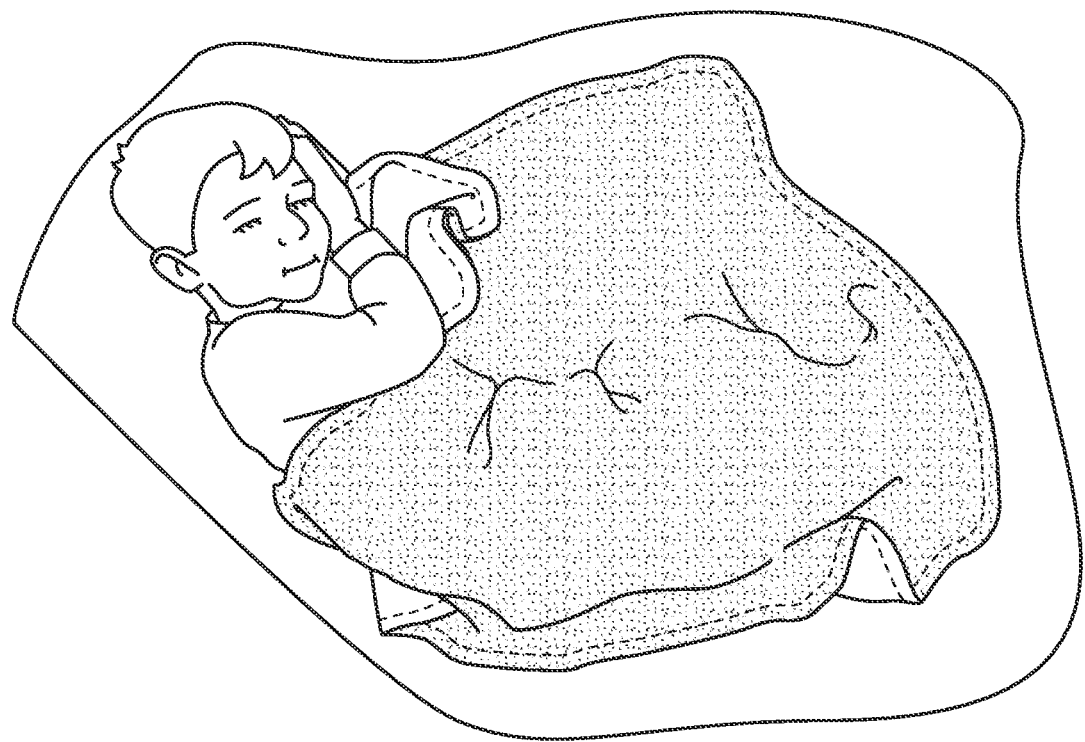
FIG. 16 illustrates the attachment of the convertible fabric covering device in use as a blanket according to an exemplary embodiment of the present disclosure.
Figure 19:
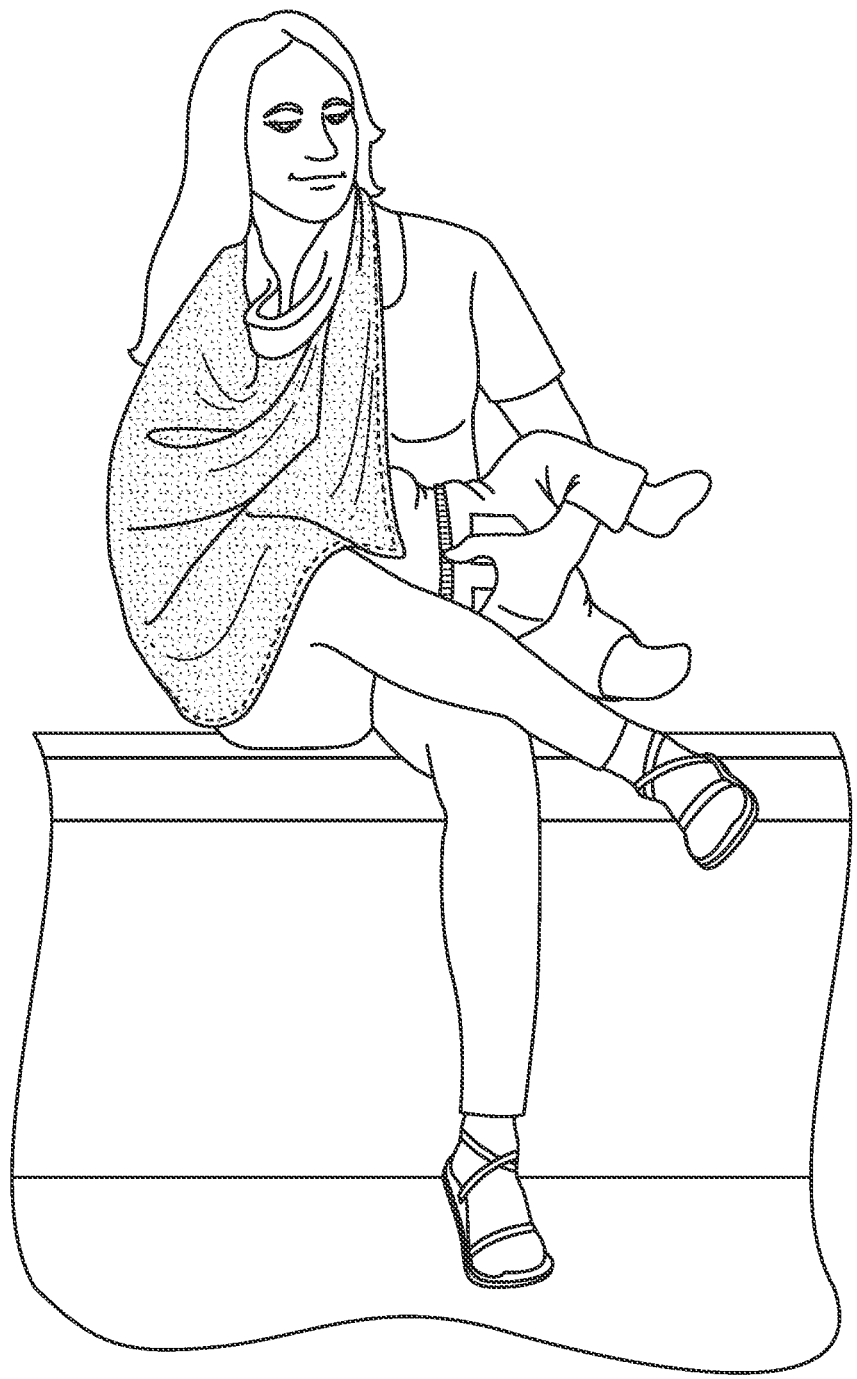
FIG. 19 illustrates the attachment of the convertible fabric covering device in use as a nursing cover according to an exemplary embodiment of the present disclosure.
Figure 20:
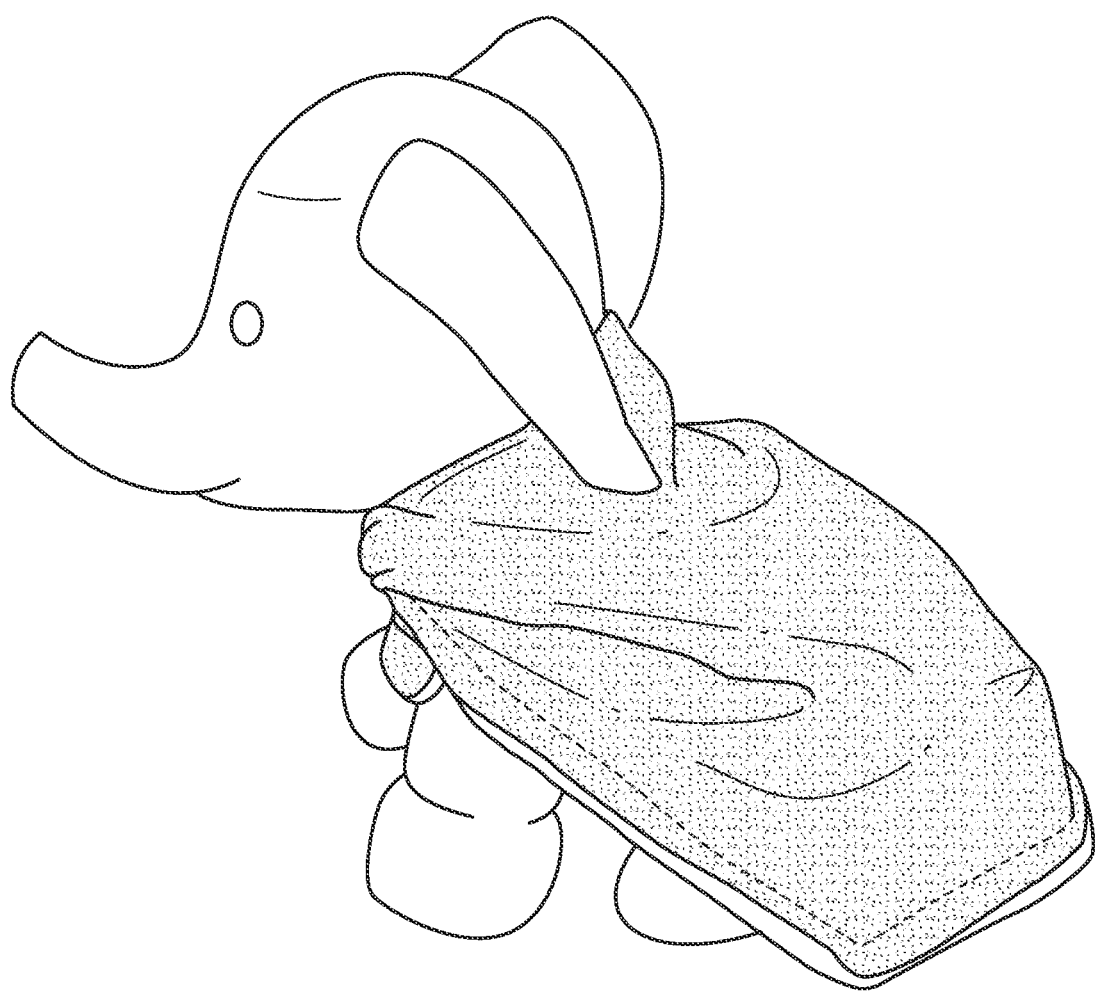
FIGS. 20 and 21 illustrates the attachment of the convertible fabric covering device in use as a stuffed animal lovie according to an exemplary embodiment of the present disclosure.
Figure 21:
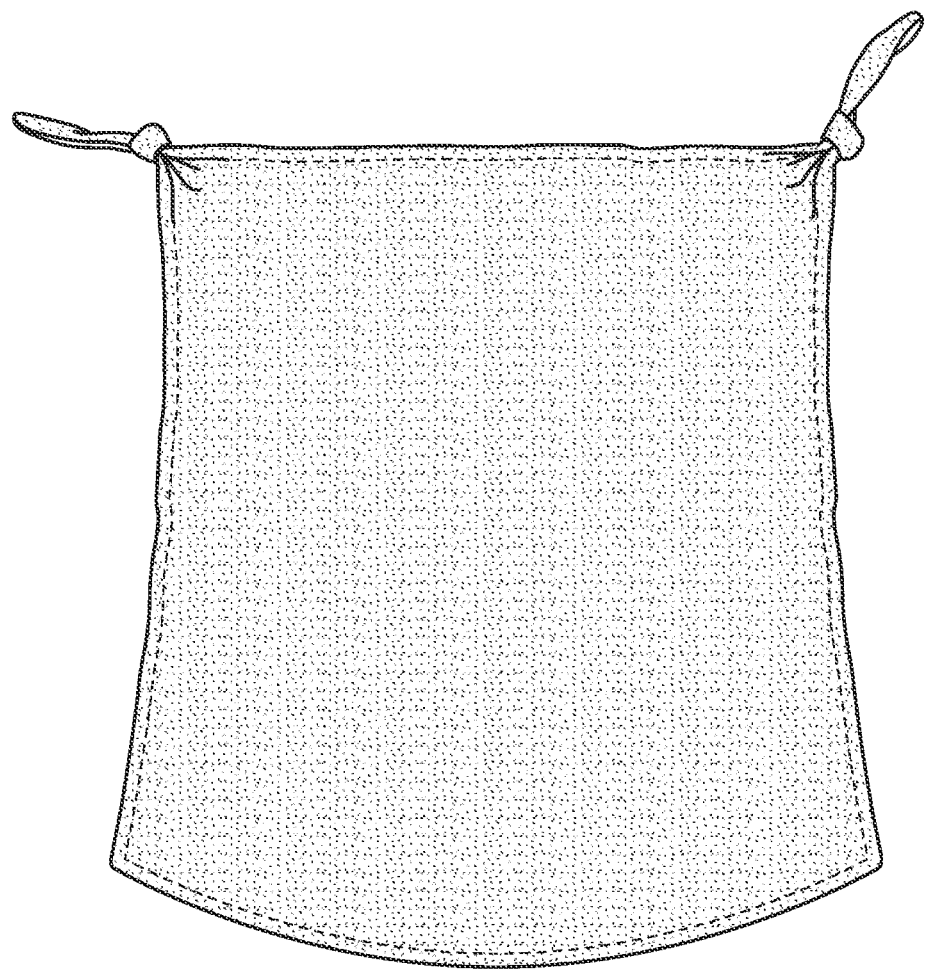
Figure 22:
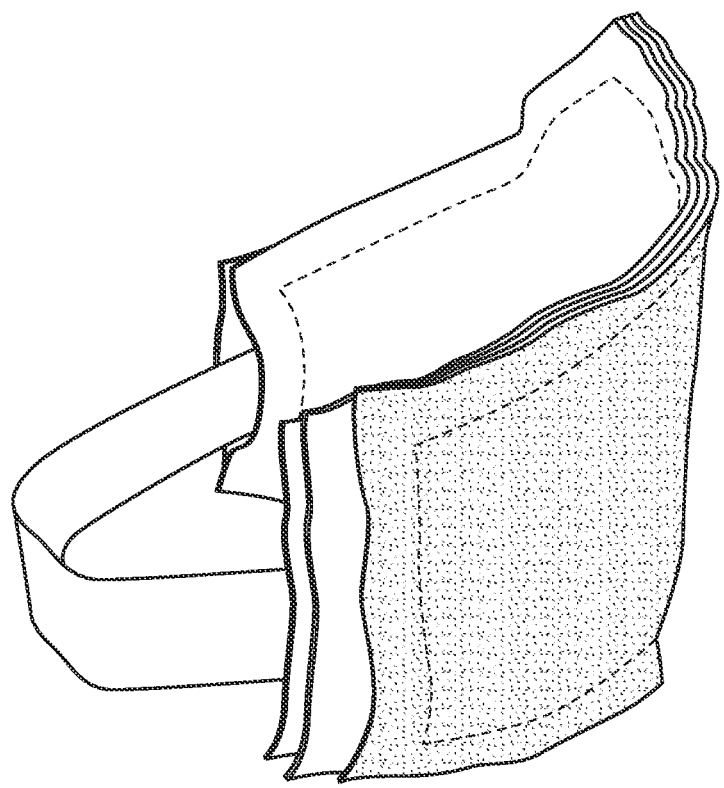
FIGS. 22 and 23 illustrates an accessory item that includes a wearable feature according to an exemplary embodiment of the present disclosure; and It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.
Figure 23:
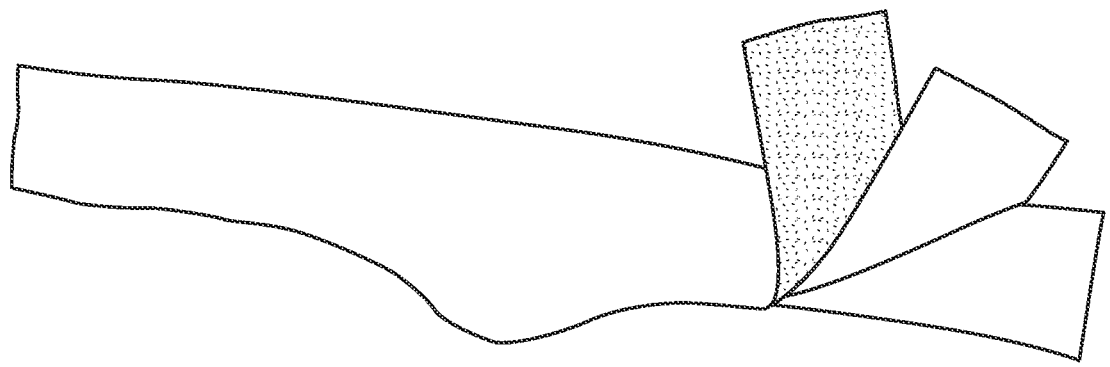

Additionally, as shown in FIGS. 15-21 the convertible fabric covering may include multiple uses. As shown in FIG. 15 the convertible fabric covering may be worn in the form of a cape or a shawl. As shown in FIG. 17 the device may be used as a blanket. Alternately, the device may be used as a towel when made of a terry cloth or other similar material. In other exemplary embodiments as shown in FIG. 19, the convertible fabric covering device may include wearable device used as a nursing cover. As shown in FIGS. 17 and 18 the convertible fabric covering device may include the wearable device coupled to a frame of a stroller using the first and second fabric tabs. Alternately, the wearable device may be coupled to a frame of an infant restraint seat using the first and second fabric tabs. Further as shown in FIGS. 20-21 the wearable device may be coupled to a toy using the first and second fabric tabs to form a lovie. Additionally, as shown in FIGS. 22 and 23 the wearable device may include an accessory item such as a crown, hat, headpiece or the like. The convertible fabric covering device may be coupled to a hanging device to form a decorative item or may accented with ribbon or pompoms. The convertible fabric covering device may be extended on a surface with the first and the second fabric tabs in a closed position to form a play-mat.

The convertible fabric device of the present disclosure provides numerous advantages. For instance, as discussed herein, the convertible fabric device is capable of providing multiple uses to a previous single use item. Importantly, the convertible fabric device facilitates caregiver versatility allowing the device to be used to provide warmth, privacy, and creative opportunities for a child. The fabric attachment tabs and the coupling mechanism disclosed herein provide flexibility safely use the device. Additionally, the convertible fabric device is attached for use and thus can be easily worn without requiring complex securing attachments.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A convertible fabric covering device comprising:
    a first fabric covering layer with a first fabric tab coupled thereon; and
    a second fabric covering layer with a second fabric tab coupled thereon, and coupled to the first fabric covering layer;
    wherein the first fabric tab and the second fabric tab include a coupling mechanism disposed at a distal end of each of the first fabric tab and the second fabric tab,
    wherein the first fabric tab includes a first coupling surface attached to the distal end of the tab and a second coupling surface attached to the second fabric covering layer opposite to a proximal end of a first fabric tab attachment point on the first fabric layer,
    wherein the second fabric tab includes a first coupling surface attached to the distal end of the tab and a second coupling surface attached to the first fabric covering layer opposite to a proximal end of a second fabric tab attachment point on the second fabric layer,
    wherein the first fabric tab is attached to an outer surface of the first fabric covering layer, and
    wherein the second fabric tab is attached to an outer surface of the second fabric covering layer.

2. The convertible fabric covering device of claim 1, wherein the first fabric tab is adapted to be in a closed position having the first coupling surface attached to the distal end of the tab coupled to the second coupling surface attached to the second fabric covering layer.

3. The convertible fabric covering device of claim 2, wherein the second fabric tab is adapted to be in a closed position having the first coupling surface attached to the distal end of the tab coupled to the second coupling surface attached to the first fabric covering layer.

4. The convertible fabric covering device claim 3, wherein the first fabric tab having the first coupling surface is adapted to be attached to a second coupling surface attached to the first fabric covering layer, and
    wherein the second fabric tab having the first coupling surface is adapted to be attached to the second coupling surface of the second fabric covering layer.

5. The convertible fabric covering device claim 3, wherein the first fabric tab is adapted to be in a closed position having the first coupling surface attached to the distal end of the tab coupled to the second coupling surface attached to the second fabric covering layer; and
    wherein the distal end of the second fabric tab is adapted to be inserted through a loop formed by the first fabric tab in the closed position and having the second fabric tab adapted to be in a closed position with the first coupling surface attached to the distal end of the tab coupled to the second coupling surface attached to the first fabric covering layer.

6. The convertible fabric device of claim 3, further comprising:
    a ring disposed between the first fabric tab and the second fabric tab when the first and second fabric tabs are in a closed position.

7. The convertible fabric device of claim 6, wherein the second fabric tab is looped around the ring and fastened to the second coupling surface.

8. The convertible fabric covering device of claim 1, wherein the convertible fabric covering device is a nursing cover.

9. The convertible fabric covering device of claim 1, wherein the convertible fabric covering device is adapted to be coupled to a frame of a stroller using the first and second fabric tabs.

10. The convertible fabric covering device of claim 1, wherein the convertible fabric covering device is adapted to be coupled to a frame of an infant restraint seat using the first and second fabric tabs.

11. The convertible fabric covering device of claim 1, wherein the convertible fabric covering device is adapted to be coupled to a toy using the first and second fabric tabs to form a lovie.

12. The convertible fabric covering device of claim 1, wherein the convertible fabric covering device is adapted to be coupled to a hanging device to form a decorative item.

13. The convertible fabric covering device of claim 1, wherein the convertible fabric covering device is adapted to be extended on a flat surface with the first and the second fabric tabs in a closed position to form a playmat.

14. The convertible fabric covering device of claim 1, wherein the first fabric covering layer is formed from a three panel assembly.

15. The convertible fabric covering device of claim 1, wherein the second fabric covering layer is formed from a three panel assembly.

16. The convertible fabric device of claim 1, wherein the first and second fabric layers have boundaries formed by a top portion of a shape that forms a straight line, a first and a second side and wherein the width between the first and second side gradually increases from the top portion to a bottom portion of the shape and a u-shaped bottom side.

17. The convertible fabric device of claim 1, wherein fabric of each fabric layer and each fabric tab is any one from the group consisting of: a cotton fabric, a synthetic material, a double gauze material, a textured material, a terry cloth material, and an organic fabric.

* * * * *